United States Patent Office 3,013,269  
Patented Dec. 19, 1961

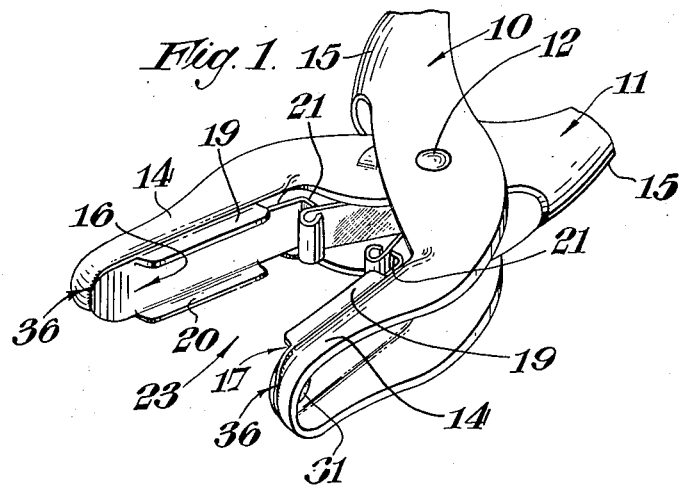
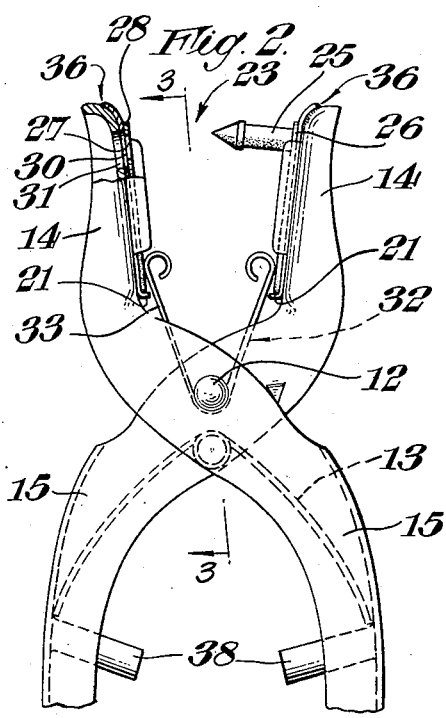
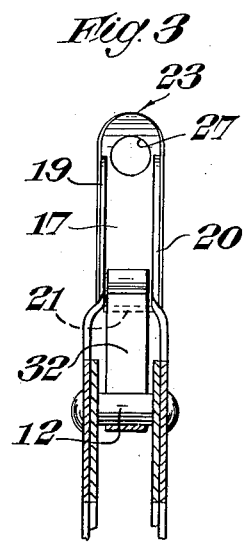

3,013,269  
ANIMAL EAR TAG ATTACHING INSTRUMENTS  
Cuthbert Brierley, Park House, Nettlebed, Henley-on-Thames, England  
Filed Dec. 21, 1960, Ser. No. 77,345  
Claims priority, application Great Britain Dec. 30, 1959  
3 Claims. (Cl. 1—47)

In my co-pending patent application there is described an improved identification tag for animals which consists of a pair of elongated tabs to lie flat one on each side of the part of the animal to which the tag is to be attached, one of the tabs having an upstanding headed spike to pass through the part of the animal to which the tag is to be attached, and the other of the tabs having a hole to receive the spike with the head of the spike entered through the hole and preventing the withdrawal of the spike from the hole.

The present invention provides an instrument in the form of a pair of pliers for attaching to an animal, in a single operation, an identification tag as just described.

Plier-like instruments are already known for attaching other forms of identification tags to animals. The arrangement adopted is that the tag is mounted between the jaw faces of the pliers with the jaws opened sufficiently far to allow the insertion of the part of the animal to which the tag is to be attached between the joining elements of the tag. The pliers are then squeezed to connect the joining elements through the part of the animal and attach the tag to the animal.

According to the present invention, the jaw faces of the "pliers" are formed or provided with side stops for laterally locating with respect to the jaws a pair of the elongated tabs, one flat against each jaw face, each face having an end stop spaced inwardly from the mouth of the jaws for locating the tabs longitudinally with respect to the jaws with the spike on the spiked tab positioned to enter the hole in the other tab when the pliers are squeezed, spring means being provided on the pliers for engaging each tab to hold the tab against its jaw face. Preferably the spring means are held deflected each by one of the stops to provide clearances between the spring means and the jaw faces for the insertion of the tabs and to pre-load the spring means. The spring means are preferably constituted by a single leaf spring having a pair of spring arms normally engaged one against each of the end stops, the leaf spring being mounted on the pliers intermediate its end, for example on a pivot pin for the plier jaws.

Preferably also the stops define tab receiving recesses in the jaw faces, which recesses are open ended at the mouth of the jaws. With this arrangement the tabs may be slid endwise into the recesses to engage under the spring means.

In order further to aid the insertion of the tabs the jaws may be rounded off at the mouth.

A specific embodiment of the present invention will now be described merely by way of example with reference to the accompanying drawings:

FIG. 1 is a perspective view of the jaw end of a pair of pliers according to the invention, with parts broken away for the sake of convenience, FIG. 2 is an elevation partly in section of the jaw end of the pliers as shown in FIG. 1, and FIG. 3 is a section on line 3—3 of FIG. 2.

Referring to the drawings, the pliers comprise a pair of handled jaw members 10 and 11 pivoted together on a hinge pin 12 in any known or convenient manner.

The handled jaw members are of generally channel section and apertured at the junction of their jaw and handle portions 14 and 15 respectively, one jaw member being received through the aperture in the other as shown in the drawings.

A two armed wire spring 13 has its spring arms engaged one within the channel of each handle, the spring 13 urging the handles apart and the jaws into their open position as shown.

The jaw portions 14 each carry a substantially corresponding formed jaw facing member, these being indicated at 16 and 17 respectively.

The members 16 and 17 comprise flat jaw facing strips having upstanding lugs 19, 20 and 21.

The lugs 19 and 20 are opposite one another at the sides of the strips and are spaced apart by the width of the elongated tabs, a pair of which are shown mounted in position in FIG. 2. The lugs 19, 20 therefore constitute side stops for laterally locating the tabs opposite one another with respect to the jaws, one flat against each of the strips 16, 17 which strips form the jaw faces of the plier jaws.

The lugs 21 are at the ends of the strips remote from the mouth 23 of the jaws and constitute end stops for locating the tabs longitudinally with respect to the jaws, the stops 19, 20 and 21 positioning the tabs with the spike 25 on the spiked tab 26 positioned to enter the hole 27 in the other tab 28 when the pliers are squeezed.

The end stops 21 are positioned inwardly of the mouth 23 of the jaws sufficiently far to accommodate the tabs 26, 28 with the ends of the tabs adjacent the mouth 23 just within the mouth.

The strip 17 has a hole 30 to lie behind the spike receiving hole in the tab 28, and a hole 31 is formed in the jaw portion 14 of the handled jaw member 10 underlying the hole 30, the holes 30 and 31 being large enough to receive with clearance the head of the spike 25.

A leaf spring 32 having a pair of spring arms 33 has a part circular intermediate portion at the junction of its arms which is sprung on to the hinge pin 12, to fix the spring to the pliers.

The arms 33 extend from the pin 12 towards the mouth 23, a little beyond the stops 21, and the ends of the arms 33 are curled inwardly i.e. rolled over away from their adjacent jaw faces. In their normal position, that is to say when there are no tabs mounted in the pliers, the spring arms 33 engage one against each of the end stops 21, the portions of the arms beyond the stops overlying the strips 16 and 17 and being inclined inwardly therctowards.

It is arranged that in their normal position the spring arms are held deflected by the end stops, i.e. the spring arms are pre-loaded by the end stops.

The rolled over ends of the spring arms form with the facing strips 16, 17 a converging entry or gap for the ends of the tabs 26, 28 when a pair of the tabs are mounted in the pliers, the width of which is less than the thickness of the tabs.

The tabs are slid endwise down the facing strips 16, 17 between the side stops 19, 20 which together with the end stops 21 form tab receiving recesses which are open ended at the mouth 23 of the jaws. To further assist the operator in inserting the tabs in the pliers the jaw portions 14 and the strips 16, 17 are rounded off as at 36, i.e. at the mouth of the pliers.

The leading ends of the tabs enter the converging gaps between the rolled over ends of the spring arms and the facing strips and the spring arms are deflected inwardly so as to lift them off the end stops 21 which finally position the tabs longitudinally as the leading end of the tabs comes up against them.

The spring arms then hold the tabs in position on the jaw faces ready for attachment to an animal, in the present example one of the animal's ears, the spring arms engaging the tabs close to the stops 21.

Because of the pre-load in the spring arms 32 an adequate spring force is obtained pressing the tabs against the jaw faces although, due to the small thickness of the tabs, only a small deflection of the spring arms occurs when the tabs are inserted in the pliers.

Once a pair of the tabs have been positioned as described, the flap of the ear is inserted in the mouth of the pliers between the spike 25 on the one tab and the hole 27 in the other and the pliers rapidly squeezed to force the spike through the ear flap and the hole 27, the holes 30 and 31 receiving the head as it emerges through the hole 27. This connects the tabs together at their end adjacent the mouth of the pliers (and to the ear flap) and when the pliers are released the tabs are pulled away from the facing strips 17 at their connected ends. This has the effect of bowing the tabs and further deflecting the spring arms 32 with the result that an ejecting action of the tabs takes place, the tabs being "shot" forward by the spring arms 32 out of the pliers.

To prevent the ear flap itself being squeezed by the pliers during the attachment of an ear tag as described, a pair of stops 38 is provided to limit the closing movement permitted to the jaws.

If the tabs are not properly positioned in the pliers before the attachment operation, i.e. if one or other or both tabs have not been pushed right home against the end stops 21, the tabs are free to align themselves and are aligned by the entry of the conical head of the spike into the hole in the other tab.

I claim:

1. An instrument for attaching to animals identification tags consisting of a pair of elongated tabs one having an upstanding spike and the other a hole to receive the spike, the instrument comprising a pair of pliers the jaw faces of which have side stops for laterally locating with respect to the jaws a pair of the elongated tabs, one flat against each jaw face with its elongated dimension extending inwardly from the mouth of the jaws, each face having an end stop spaced inwardly from the mouth of the jaws for locating the tabs longitudinally with respect to the jaws, the stops being positioned so as to locate the tabs with the spike on the spiked tab positioned to enter the hole in the other tab when the pliers are squeezed, and spring means on the pliers for engaging each tab to hold the tab against its jaw face, the spring means comprising a pair of spring arms each held deflected by one of said stops thereby to provide clearances between the spring arms and the jaw faces for the insertion of the tabs and to pre-load the spring arms the spring arms overlying the jaw faces only in a region immediately adjacent the end stops to engage the tabs towards their inner ends.

2. An instrument as claimed in claim 1, wherein the spring arms have rolled-over ends forming a convergent entry gap for the tabs between the spring arms and the jaw faces.

3. An instrument as claimed in claim 1, wherein the spring arms are formed as parts of a single leaf spring mounted intermediate its ends on the pliers.

References Cited in the file of this patent

UNITED STATES PATENTS 1,474,547     Pannier _____ Nov. 20, 1923